Figure 1:
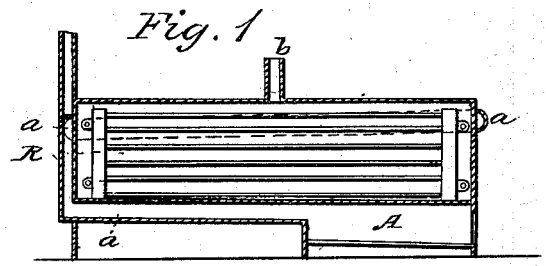

W. MULLEE.
Preparing India Rubber.

No. 62,055. Patented Feb. 12, 1867.

Witnesses:
O. T. Dodge
K. B. Munn

Inventor:
W. Mullee.
By Dodge & Munn.
his Attorneys.

UNITED STATES PATENT OFFICE.

WILLIAM MULLEE, OF FRANKLIN, PENNSYLVANIA.

IMPROVEMENT IN PROCESS OF PREPARING INDIA-RUBBER.

Specification forming part of Letters Patent No. 62,055, dated January 26, 1867.

*To all whom it may concern:*

Be it known that I, WILLIAM MULLEE, of Franklin, in the county of Chester and State of Pennsylvania, have invented certain new and useful Improvements in the Process of Preparing India-Rubber; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel process of treating india-rubber, to prepare it for use and manufacture, and in certain mechanical devices to be used in the said process.

In the drawings, Figures 1, 2, 3, and 4 represent the mechanical devices alluded to, and which will be hereinafter explained.

The admixture of sulphur with india-rubber has long been known and used, both where the sulphur is mixed with the rubber, as in the Goodyear process, and where the rubber is immersed in melted sulphur, as in the process patented to Thomas Hancock in 1843; but neither of these processes is entirely successful in all cases. Where the sulphur is mixed mechanically with the rubber, as in the Goodyear plan, a larger percentage of sulphur is used than is desirable, and the particles of sulphur imbedded in the rubber, when subjected to the subsequent heating necessary to complete the process, melt and form cavities in the mass or blisters on the surface. Not only is the quality and appearance of the prepared article thereby injured, but the large percentage of sulphur contained renders the use of the compound for jewelry and similar purposes impracticable when united with metals, except gold of a very fine quality, because of the injurious effect of the sulphur.

Figure 2:
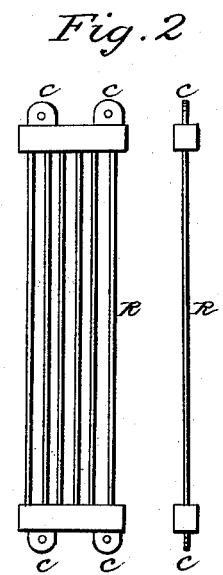
Figure 3:
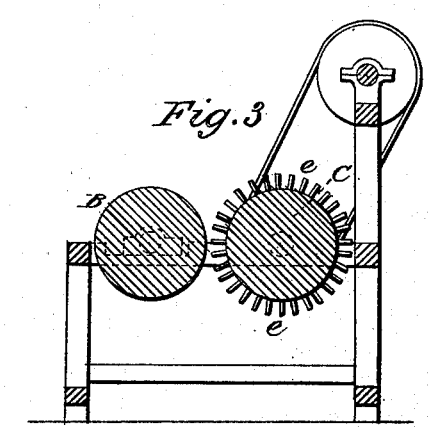
Figure 4:
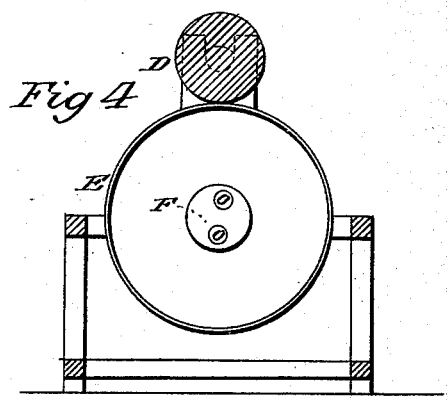

The process of Hancock was even more imperfect, for the reason that by his process the exterior or surface of the rubber was more or less injured by the excessive heat, while the interior was not sufficiently penetrated by the melted sulphur in which it was immersed. To remedy these objections or imperfections is the object of my present invention, which is as follows: I first prepare the crude gum in the usual manner, and then roll it into sheets, not exceeding a thirty-second of an inch in thickness, or even thinner. These sheets are then placed between racks or frames composed of wire rods united to a bar at the ends, as represented in Fig. 2. These frames are provided with lugs *c* at the ends, through which rods are passed to unite the frames, any number being thus united with a sheet between each.

It will be observed that the space between the frames, is several times the thickness of the sheets, so as to permit the melted sulphur free access to the surface of the sheets.

The frames, with the sheets of rubber inserted, are then placed in a bath containing melted sulphur, heated to 220° to 230° of Fahrenheit, the racks or frames with the sheets being inserted in the bath so as to rest on their edge, as shown in Fig. 1.

The bath consists of an oblong vessel, with a fire-place, A, underneath, and having a flue, *a*, extending back and upward at the rear end, and passing thence around the side and front end, and back to the smoke-stack or chimney, as shown in Fig. 1, which is a vertical section. A mercury gage should be attached at *b* or other proper point, to indicate the temperature, so that it may be regulated as necessary.

The sheets having remained in the bath from an hour to an hour and a quarter, according to their thickness, are then removed and taken out of the frames. In a few minutes the sheets will become dry, and their surface will then be found covered with crystals of sulphur. These crystals are then removed, first, by scraping off the looser portions, and then by passing the sheet between the rollers B and C of the machine, represented in Fig. 3. The sheet is simply laid on the roller B, which is permitted to rotate slowly to feed the sheet in, while the roller C revolves much more rapidly, the teeth *e*, with which the latter is armed, coming in contact with the sheet, and scraping off the remaining crystals.

A quantity of the sheets, thus cleaned, are then placed together, and passed through the ordinary mill used for kneading or grinding rubber, the rolls of the mill being kept heated to about 90°. This kneading process is continued until the sheets are thoroughly worked up, when the rolls of the mill are adjusted so as to finally press the mass into a sheet nearly as thin as tissue-paper, by which means any adhering or remaining crystal will be removed, especially such as might remain adhering to the edges of the sheets after passing between the rollers B and C. While in this condition, the rubber will sometimes be more or less brittle or crumbly; and I then mix with it a small quantity of raw rubber or gutta-percha, or a compound of linseed-oil and gum-shellac boiled to a thick paste, and work the whole thoroughly together by means of the mill. When sufficiently worked, so as to be sure that the ingredients are intimately commingled, I heat the rolls of the mill to about 200°, and pass the mass through in the form of a very thin sheet, which is wound on the hollow drum E of Fig. 4. The thin sheet, in being wound on this drum, passes under the solid or heavy metallic roller D, which presses the successive layers firmly together, so as to cause them to adhere and unite in one mass, and expelling the air from between them. This winding is continued until a layer is formed around the drum of any desired thickness, when, by cutting it lengthwise of the drum, it is easily detached. The drum is kept hot by steam or hot air passing in through one of the pipes o, in the hollow journal F, and out at a similar pipe, either at the same or the opposite end of the cylinder.

The rubber, as it comes from the drum, is then placed between metallic plates or sheets of paper, or into a mold, and subjected to a pressure of about ninety pounds to the inch, and kept hot for nine or ten hours, after which it is ready for use.

I have found, by experiment, that rubber thus prepared is thoroughly vulcanized, and that a less quantity of sulphur is absorbed than by either the Goodyear or Hancock process. I am thereby enabled to produce a material that can be used with gold of less than eighteen karats, that is free from crystals, cavities, or blisters, and that is capable of receiving a much finer polish, and that will retain the polish for a longer period.

It is obvious that the form of bath and frames may be varied at will, and that, instead of the solid roller D, a hollow roller may be substituted, and be pressed or held down by springs or weights; and hence I do not wish to be understood as confining myself to the devices herein described. Neither do I desire to be understood as claiming these devices as constituting the essential part of my invention; but, rather, as a simple and efficient means of carrying out and applying my improved process in the treatment or preparation of rubber. Neither do is wish to be understood as claiming as my invention the immersion of sheets of rubber in melted sulphur, independent of the other steps or parts of the process; but,

Having thus described my invention, what I claim is—

1. The above-described process or method of treating or preparing india-rubber for use or manufacture.

2. As a new article of manufacture, the substance produced by subjecting india-rubber, either pure or when mixed with other substances, to the process hereinafter described.

3. The rack R or their equivalent for holding the sheets of rubber while in the bath, as set forth.

4. The combination of the feed-roller B, and the roller C, armed with teeth for removing the crystals from the sheets, as described.

5. The hollow drum E and the roller D, when combined and used for the purpose set forth.

6. The bath, with the fire-place A and the heat-flue or passage a, arranged as herein shown and described.

WILLIAM MULLEE.

Witnesses:
    W. C. DODGE,
    D. E. CASTLE.